Patented Nov. 30, 1926.

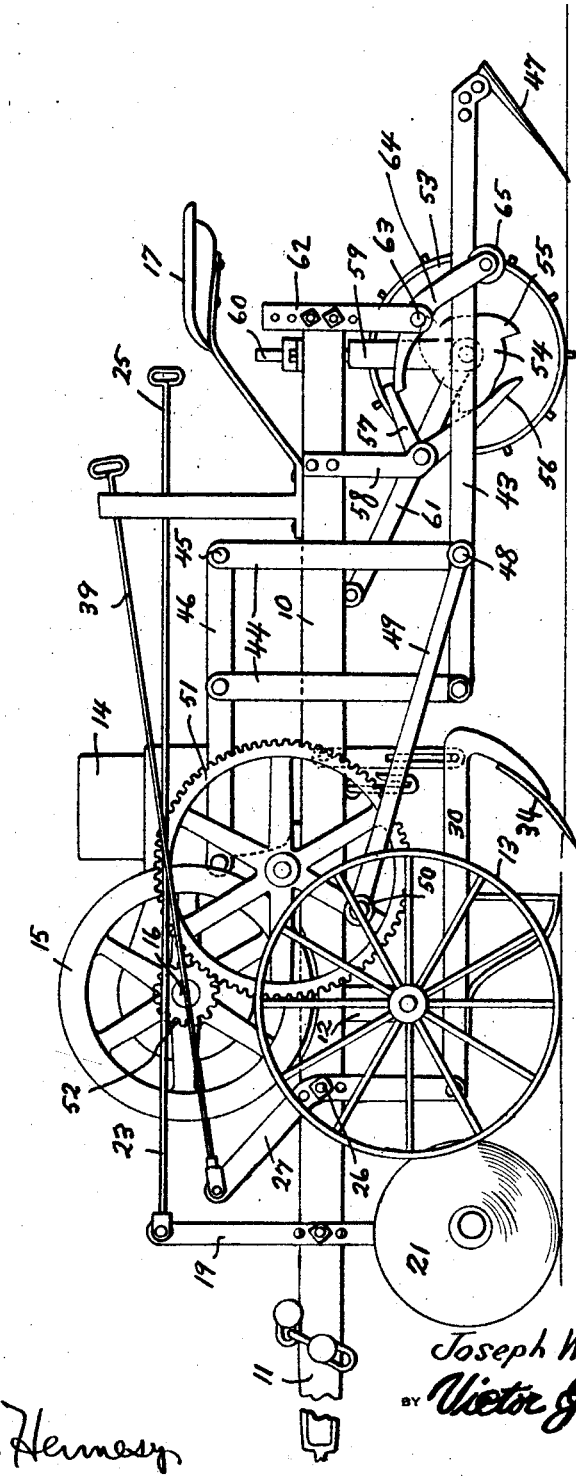

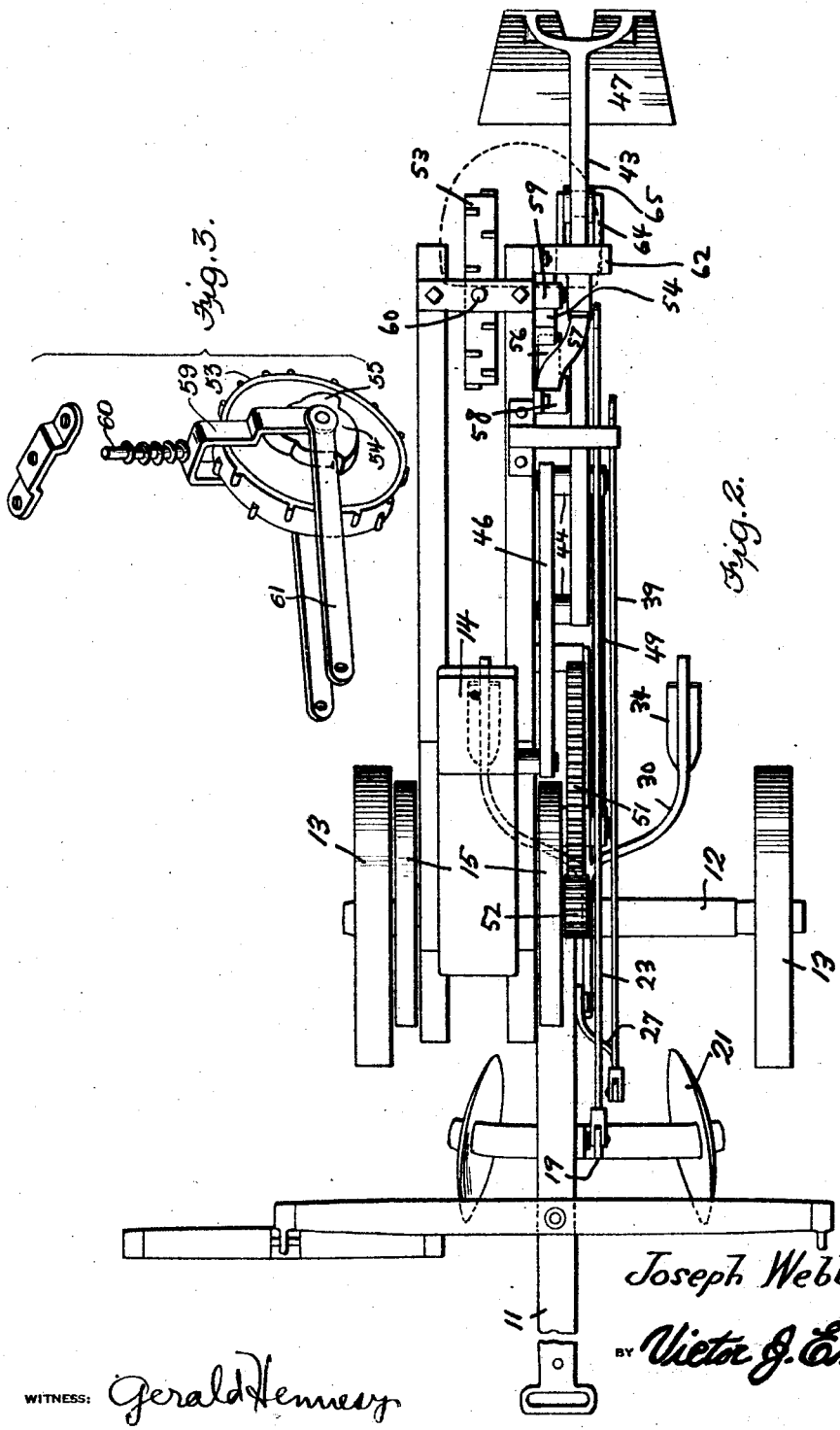

1,609,231

UNITED STATES PATENT OFFICE.

JOSEPH WEBB, OF LOACHAPOKA, ALABAMA.

COTTON CULTIVATOR AND CHOPPER.

Application filed November 23, 1925. Serial No. 70,893.

This invention relates to agricultural implements, particularly to devices for working on growing cotton, and has for its object the provision of a novel machine adapted to be drawn along the ground by horse or other power and provided with means for throwing up the soil at the sides of a row of growing cotton plants and also for chopping out the plants at periodical intervals as is necessary to effect thinning.

An important object is the provision of a device of this character equipped with an internal combustion engine mounted on the frame and operatively connected with the means for operating the chopping elements or hoes.

Yet another object is the provision of a device of this character equipped with novel means extending within convenient reach of the driver mounted upon a suitable seat, the means being operable to effect lifting of the cultivating and chopping element out of engagement with the ground in case of traveling over stumps, stones or the like and also when turning.

An additional object is to provide a device of this character which will be comparatively simple and inexpensive in manufacture, easy to operate and control, positive in action, efficient and durable in service, and a general improvement in the art.

With the above and other objects and advantages in view, the invention consists in the details of construction, and the arrangement and combination of parts to be hereinafter more fully described, and claimed, and illustrated in the accompanying drawings, in which:

Figure 1 is a side elevation of the complete device.

Figure 2 is a top plan view thereof.

Figure 3 is a detail perspective view of the cam or tappet wheel provided for operating the chopping hoes.

Referring more particularly to the drawings, the numeral 10 designates the supporting frame of the device which may consist of any suitable or desired number of parts of any preferred material and size secured together in any proper manner. This frame includes a beam 11 to which horses, other draft animals or a tractor may be hitched for the purpose of drawing the device along a field. Mounted transversely of the frame is a supporting axle structure 12 carrying ground engaging wheels 13, and mounted upon the frame is an internal combustion engine 14 of any ordinary or preferred type including a fly wheel 15 on the shaft 16. Mounted at the rear end of the frame is a seat 17 for the accommodation of the driver or operator.

The machine is also shown as provided at its forward portion with a pivoted standard 19 equipped with adjusting means such as that disclosed at 23 and carrying disks 21 for the purpose of digging up the ground at the sides of the row of growing plants to be chopped. Additional means for digging up the ground may consist of a beam 30 carrying ground engaging elements 34 and connected with a lever member 27 pivoted at 26 upon the main beam of the machine and provided with adjusting means 39. These parts are shown in view of the fact that it is proper and necessary to disclose some means for digging up the ground at the sides of the row of plants, though it should be understood that no claim is being made to this structure.

Located beneath the frame 10 is a longitudinally extending bar 43 suspended by means of hangers 44 pivoted at 45 upon a bar 46 mounted above the frame. At its rear end the bar 43 carries a chopping hoe 47 which is inclined downwardly and forwardly as shown and which is adapted to be dug into the ground periodically for the purpose of chopping out the plants at intervals. Pivotally connected at 48 with the bar 43 is a link 49, or pitman, engaged upon a wrist pin 50 carried by a gear 51 suitably journaled on the frame and driven by a pinion 52 on the engine shaft 16.

For effecting lifting of the beam 43 so that the chopper 47 will be properly operated, I provide a ground engaging wheel 53 carrying a cam wheel 54 having a plurality of cam elements 55 thereon adapted to engage a trip arm 56 at one end of an angle lever 57 pivoted on a depending bracket 58 carried by the frame. Obviously, the ground engaging wheel 53 must be capable of movement with the bar 43 and it is therefore shown as journaled in a fork member 59 having a shank 60 slidable through the frame, the fork being furthermore supported at the shaft of the wheel 53 by means of a pivoted inclined or diagonal brace 61. Vertically adjustably mounted on the frame is a depending bracket 62 upon which is pivoted at 63, a trip arm 64 which has its forward end engageable by the angle lever 57 and which has its other end carrying a journally mounted roller 65 located beneath the bar 43.

In the operation of the device, it will be apparent that when it is drawn along a field in straddling relation to a row of growing cotton plants the rotation of the engine shaft will cause rotation of the gear 51 and consequently backward and forward movement of the bar 43 carrying the chopping hoe 47. At the same time, the rotation of the wheel 53 owing to its passage over the ground will cause the cam elements 55 carried thereby to engage the end member 56 of the angle lever 57 at periodic intervals and rock the angle lever so that the upper arm thereof cooperating with the arm 64 carrying the roller 65 will cause the bar 43 to be moved upwardly and downwardly at the same time it is moved longitudinally, thus producing a chopping action on the part of the member 47 which will dig up and remove growing plants at intervals. Whenever it is desired to render the device inoperative, it is of course clear that the engine may be cut off and the handles 25 and 41 properly manipulated to withdraw the ground engaging element from the soil. This is of course a great advantage when making turns, traveling to and from the work, and when passing over stumps, rocks or other obstructions.

From the foregoing description and a study of the drawings, it will be apparent that I have thus provided a simply constructed and inexpensive device for the purpose specified, and one which will be usually effective in not only digging up or chopping out cotton plants at intervals but in loosening the soil and throwing it up to the row of growing plants as is proper. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. A device of the character described, comprising a wheeled frame, a beam suspended beneath the frame and carrying a chopping element, a ground engaging wheel journaled on the beam and carrying a plurality of cam elements, an angle lever having one arm disposed in the path of travel of said cam elements, and a trip lever pivoted on the frame and having one end in the path of movement of the other arm of the angle lever and having its other end carrying a roller disposed beneath the beam whereby to raise and lower the same at intervals, a power device on the frame, and a pitman driven by the power device and pivotally connected with the beam for moving the same forwardly and rearwardly.

2. In a machine of the character described, a frame equipped with ground engaging wheels, a roller journaled beneath the frame and carrying a cam, a chopping bar suspended beneath the frame, power driven means on the frame connected with the bar for moving the same longitudinally, and a member pivotally supported beneath the frame and engaging the bar and the cam for moving the former vertically at periodic intervals.

3. In a machine of the character described, a wheel supported frame, a rotary driven element thereon, a ground engaging roller journaled beneath the frame and carrying a cam, a bar located beneath the frame and carrying a chopping element, suspension links for the bar, a pitman pivotally connected with said rotary element and the bar for moving the latter longitudinally, and an arm pivoted on the frame and engaging beneath said bar and operated by said cam for moving the bar vertically at intervals.

In testimony whereof I affix my signature.

JOSEPH WEBB.